Aug. 6, 1963 T. A. DOURDEVILLE 3,099,871
SEAM JUMPING APPARATUS FOR CLOTH SHEARING MACHINES
Filed March 29, 1961 4 Sheets-Sheet 1

INVENTOR
THEODORE A. DOURDEVILLE
by Charles R. Fay,
ATTORNEY

Aug. 6, 1963 T. A. DOURDEVILLE 3,099,871
SEAM JUMPING APPARATUS FOR CLOTH SHEARING MACHINES
Filed March 29, 1961 4 Sheets-Sheet 3

INVENTOR
THEODORE A. DOURDEVILLE by Charles R. Fay

ATTORNEY

United States Patent Office 3,099,871
Patented Aug. 6, 1963

3,099,871
SEAM JUMPING APPARATUS FOR CLOTH
SHEARING MACHINES
Theodore A. Dourdeville, Holden, Mass., assignor to
David Gessner Company, Worcester, Mass., a corporation of Massachusetts
Filed Mar. 29, 1961, Ser. No. 99,080
7 Claims. (Cl. 26—17)

This invention relates to cloth shearing machines utilizing rotary shearing blades coacting with ledger blades to shear the protruding fibers at the surface of the cloth to a uniform extent. Such machines operate rapidly on lengths of cloth sewed together transversely of the web running through the machine, and the shearing operation is so close that the seams between pieces of cloth will be cut, damaged, etc., so that it is necessary to provide some way of jumping the seam by the cloth shearing apparatus. This seam jumping must be very accurate so as to shear the cloth as close as possible to the seam at both sides thereof to reduce loss of sheared fabric while still keeping the seams intact.

Many different ways have been provided in the past for doing this, the most common way being to arrange the rotary shear and the ledger blade on a tilting support and arranging some means operated by a feeler or a photoelectric cell to tilt these members as a unit away from the cloth rest over which the cloth proceeds as it is sheared.

It is one of the principal objects of the present invention however to provide for motion of the cloth rest away from the combined rotary and ledger shear blades and keeping the cutting blades at all times maintained in fixed relationship. When these blades are moved, it is sometimes difficult to ensure that they return to their original shearing position exactly as set but by moving the cloth rest itself and leaving the shearing blades in fixed position, it has been found that a more accurate repositioning of the cloth relative to the shearing blades is obtained, as well as avoiding any possible disturbance of the inter-relationship of the blades themselves.

Further objects of the invention include the provision of a fast acting cloth rest moving apparatus so as to reduce the length of cloth skipped by the shearing blades to the smallest possible extent but at the same time to make sure that the seam is untouched by the blades. The rapidity of travel of the cloth and the unavoidable time lag in separating the blades from the rest creates a problem largely obviated by the present invention which contemplates the use of a photoelectric cell or cells located adjacent the cloth web and using ordinary light which passes through gaps in the seam caused by the tension on the web as it passes the cell or cells, to actuate solenoid means substantially instantaneously for the purpose of actuating an eccentric shaft upon which the cloth rest is mounted and moving the same substantially instantaneously away from the combined rotary and ledger blades; and including means for quickly and accurately repositioning the cloth rest in original operating cloth shearing position upon the passage of the seam over the rest.

Another object of the invention resides in the provision of a series of photoelectric cells arranged across the web providing for correct time interval for the drop of the rest in case of a skew seam, the cells being connected so that all cells energize a relay which actuates the mechanism to drop the cloth rest, the relay providing enough time for the relative separation of blades and cloth. If the web is traveling at thirty yards a minute, the rest drops just in time to avoid the seam and returns approximately after an interval of passage of six inches of the web. In the event there is a skew seam, the rest is kept dropped a longer time because of the multiple photoelectric cells. Provision of a machine of the class described above wherein the photoelectric cells are arranged in a certain closely spaced relationship to the cloth rest ordinarily requires no specially designed and built time delay mechanism as in all similar machines of the prior art where the photoelectric cells are remote from the rest. The present mechanism is simplified by utilizing merely the conventional photoelectric cells and conventional time delay relay having a built-in timer, so that the present machine provides for a less expensive control apparatus than prior art machines of the class described.

Other objects and advantages reside in a new and improved adjustment for the ledger blade including an angular adjustment and a horizontal adjustment of novel construction in which the edge of the ledger blade can be extremely accurately set relative to the rotary blade, and also including certain new and improved constructional features involved in the mounting of the cloth rest and the actuation thereby through a solenoid means, etc., for retraction and repositioning thereof with respect to the area of cutting of the shearing blades, and including a novel automatic web take-up means to maintain tension on the web while the cloth rest is dropped.

The invention further relates to arrangements and combinations of parts which will be hereinafter described and more particularly set forth in the appended claims.

Reference is to be had to the accompanying drawings, in which

FIG. 4 is a diagrammatic view illustrating the solenoid means and hand lever setup;

FIG. 5 is a section on line 5—5 of FIG. 2, and

In illustrating the invention, only so much of the machine is shown as is necessary to explain the invention. A framework generally indicated at 10 may be mounted on the floor or wherever convenient, and this framework supports in general most of the mechanism of the machine and especially the mechanism to be described.

Figure 2:
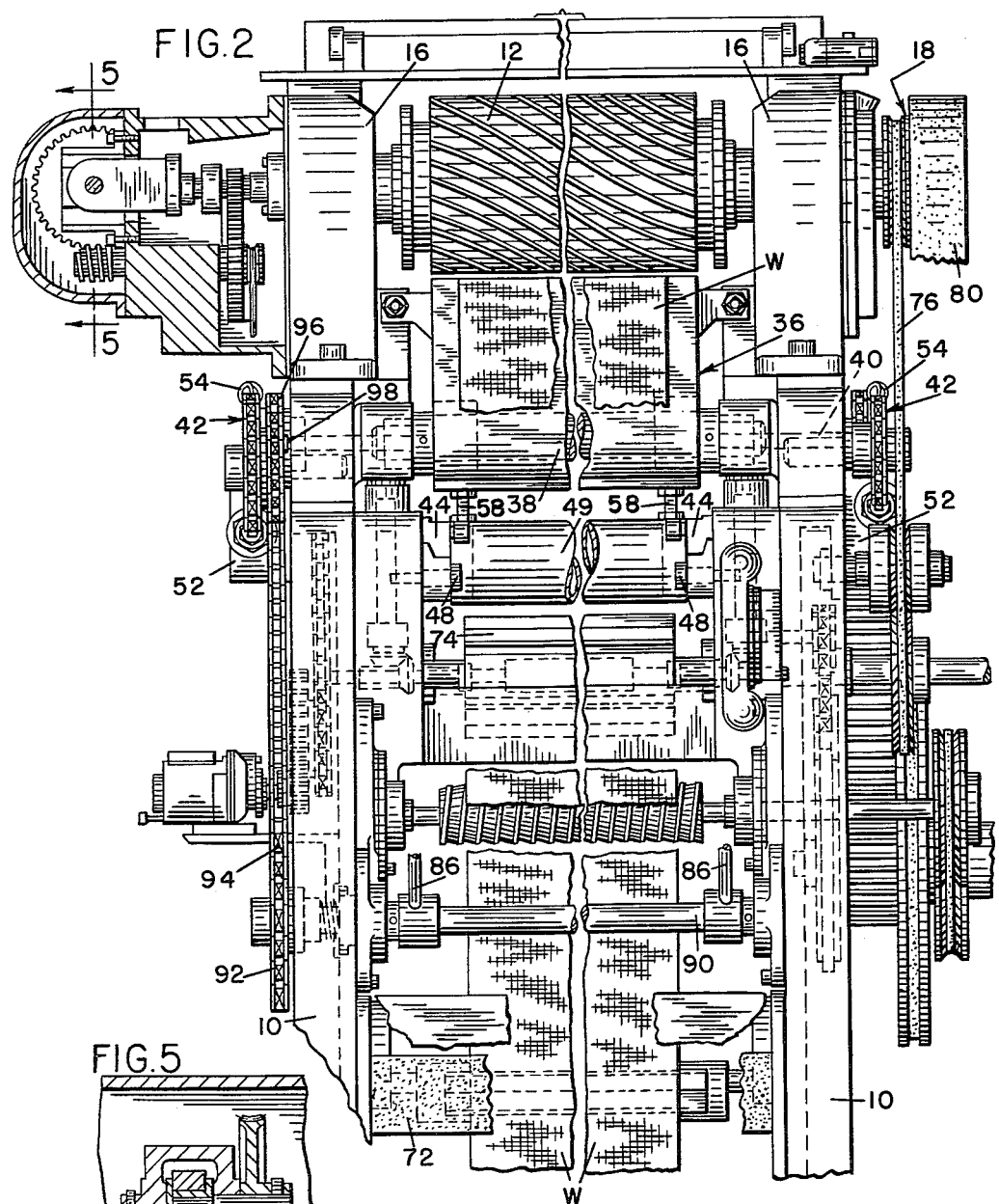
FIG. 2 is a view in elevation on an enlarged scale, looking in the direction of arrow 2 in FIG. 1.

The rotary blade is indicated at 12 and it is mounted fixedly on shaft 14 in turn mounted in bearings in housings 16, 16 which are in fixed position bolted to the framework. As shown in FIG. 2, the rotary blade 12 may be driven by a pulley or the like generally indicated at 18 and it may be lubricated in any way desired.

Figure 3:
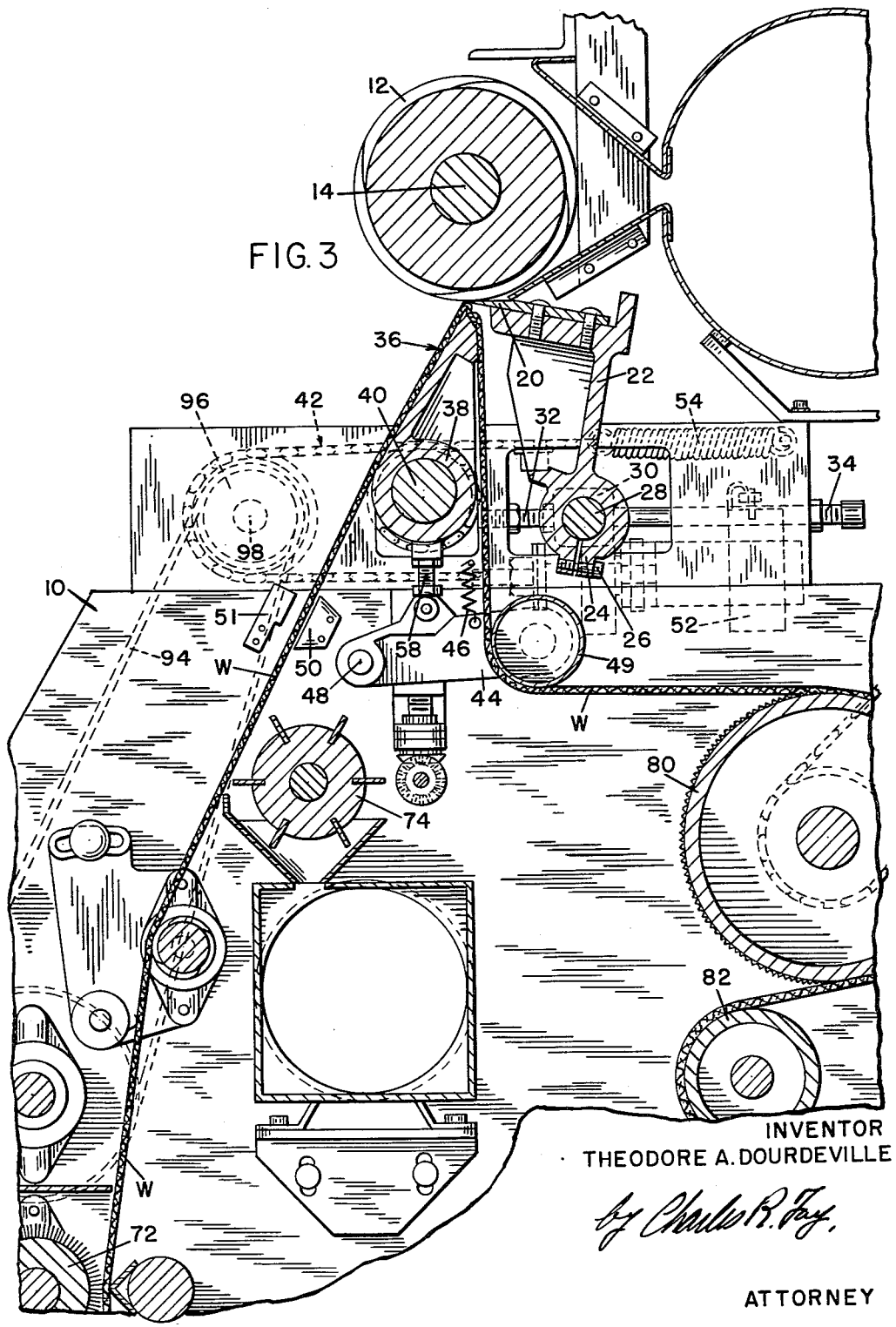
FIG. 3 is a view illustrating a portion of the mechanism shown in FIG. 1 on an enlarged scale.
Figure 6:
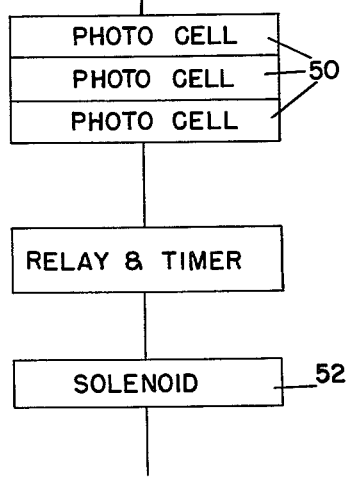
FIG. 6 is a simplified electric diagram in block form illustrating the essential connections.

The ledger blade is indicated at 20 and is mounted in adjustable relation relative to the surface of the rotary blade by means of a blade-holding standard 22 having a split clamp 24 which has a bolt 26 to lock it about a cylindrical shaft 28. The cylindrical shaft 28 is located in a rectangular block 30 and this block may be supported as desired but is free to move left and right in FIG. 3, for instance, by means of setscrews 32 and 34 mounted in portions of the framework. In this way the edge of the ledger blade 20 may be set exactly where desired with respect to the rotary blade 12.

The cloth rest is generally indicated by the reference character 36 and is provided with an annular portion 38 which receives an eccentric shaft 40. The eccentric shaft is adapted to be rotated by means of chains generally indicated at 42, these chains being in essence wrapped about the shaft and when moving in one direction turn the shaft so as to drop the cloth rest 36, and when moved in the opposite direction the rest is brought back to its original position. A lever 44 has a return spring 46 and is mounted by a pivot 48, having a takeup roll 49. When the cloth rest is moved down, the lever pivots to move roll 49 downwardly so as to take up the web W and thus to maintain tension on the web, so that no ruffling will occur due to the fact that the cloth web W going over the point or edge of the rest is retracted.

The reference numeral 50 indicates a photoelectric cell arrangement and it is to be understood that there are a plurality of cells extending across the machine. Usually three is sufficient. These photoelectric cells are arranged to collect falling light from the atmosphere or from a light source 51, the light passing through the traveling web when a seam passes, and gaps in the seam will allow light to fall on the cells whereas otherwise the web itself blocks off the light. By having a plurality of photoelectric cells, a skew seam is provided for, i.e., any one of the cells will operate the mechanism to be described and therefore the last cell over which the skew seam passes will still hold the apparatus energized in order to provide for a greater jump or gap in the operation of the shearing blades.

The broad aspect of the present invention resides in the fact that the photoelectric cells are arranged as close as possible to the cloth rest regardless of how many photoelectric cells are applied to the machine, and this provides for the ability of the machine to be able to utilize a commercially available relay with a built-in timer. This relay and timer are not illustrated as they are available commercially as is well recognized but in any event they serve to operate solenoid means generally indicated at 52, and connected to the chains 42 in essence and operate to turn eccentric shaft 40 to cause the cloth rest to descend.

If the cloth is traveling say for instance at the rate of thirty yards per minute, the rest drops just in time to skip over the seam and to provide a sufficient gap across the seam to the point where the solenoid means is de-energized; whereupon springs indicated at 54, essentially connected to the opposite end of each chain 42, snaps the cloth rest back to original position.

From the above it will be seen that the cloth rest is most efficiently and instantaneously dropped and returned when the seam has passed, even though there should be a skew seam involved. The position of the rotary blade is fixed and once the ledger blade 20 has been adjusted by the means described, it stays in this position relatively to the rotary blade, with only the cloth rest itself being dropped. The construction utilized herein ensures the fact that the cloth rest will always return to its desired position. Screws 58 can be re-set to adjust the drop of the take-up roll 49.

The arm 44 provides a web takeup so that the cloth is always held taut regardless of the fact that the cloth rest is dropped momentarily. Since the relay with built-in timer acts faster the faster the seam travels, an inherent capacity of the relay is utilized to enhance the efficiency and speed of operation of the present invention but in turn this advantage depends considerably on the position of the photoelectric cells 50 which, as stated, are located in the present invention as close to the cloth rest as is reasonably possible.

Figure 1:
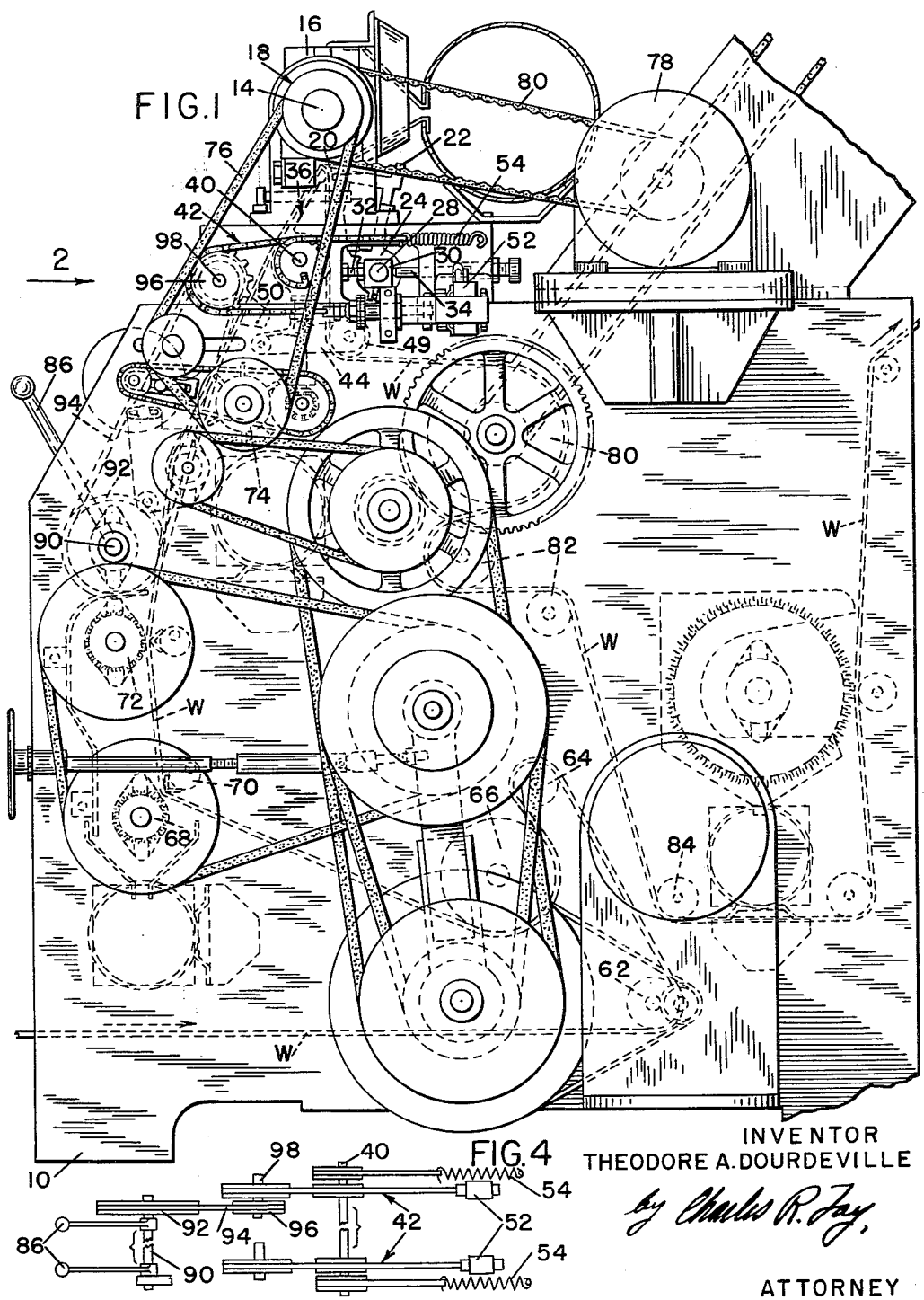
FIG. 1 is a view in side elevation illustrating the machine, parts being omitted for clarity of illustration.

Now referring to FIG. 1, the web enters in the illustration shown herein at the lower left-hand portion of the frame 10 and passes over guide-rolls 62, 64, a draft roll 66, to a brush 68. This brush is provided with an adjustable guide member 70 holding the web to the brush with greater or less degree of closeness and the same is true as to the brush 72. The cloth also passes a cleaning roll 74 which is adapted to be driven as by a belt 76 from the pulley 18, pulley 18 being driven from a motor 78 by a belt 80.

The machine also involves other apparatus known in the art such as the block suction boxes illustrated and other brushing rollers and equipment, but in any event after passing over the cleaning roll 74, the cloth passes over the cloth rest, down and in under the take-up roll at 49 over draft roll 80, guide-rolls 82, 84, etc., and thence out of the machine.

In the event that the cloth rest member is desired to be dropped when the machine is or is not running, this is accomplished through the mediary of hand levers 86, see particularly diagram FIG. 4. These hand levers are connected for instance to a shaft 90 to which is connected a wheel 92 and a chain 94. The chain 94 is directed over a pulley 96 and oscillates shaft 98 which receives a wrap of the chains 42 and hence when either of the hand levers 86 is pulled downwardly the eccentric shaft 40 is also moved against the action of the spring 54 of which there may be two so as to drop the cloth rest without any energization of the solenoids.

Having thus described my invention and the advantages thereof, I do not wish to be limited to the details herein disclosed, otherwise than as set forth in the claims, but what I claim is:

1. Seam jumping mechanism for a cloth shear including a frame, a rotary and ledger blade shearing means on the frame in combination with a cloth rest, means mounting the cloth rest for motion to and from the rotary and ledger blades, and means maintaining the rotary blade and ledger blade in fixed relation to each other and to the frame, means for moving the cloth rest to provide a gap in the shearing action as a seam approaches the shearing area, said means embodying a seam detector positioned adjacent the cloth rest, the mounting means for the cloth rest comprising an eccentric shaft, means to at least partially rotate the same, means actuating said rotating means under the control of the seam detector according to the passage of a seam, the means for at least partially rotating the eccentric shaft including a wrap-around flexible device and means for moving the same selectively in either direction.

2. Seam jumping mechanism for a cloth shear as set forth in claim 1 wherein said last-named means includes a resilient device and a solenoid, said means actuating said rotating means under the control of the seam detector controlling the actuation of the solenoid by closing an electric circuit therefor.

3. Seam jumping mechanism for a cloth shear as set forth in claim 1 wherein said last-named means includes a resilient device and a solenoid, said means actuating said rotating means under the control of the seam detector controlling the actuation of the solenoid by closing an electric circuit therefor, said detector including a light-sensitive device positioned adjacent the cloth rest.

4. Seam jumping mechanism for a cloth shear as set forth in claim 1 wherein said last-named means includes a resilient device and a solenoid, said means actuating said rotating means under the control of the seam detector controlling the actuation of the solenoid by closing an electric circuit therefor, said detector including a light-sensitive device positioned adjacent the cloth rest actuated by light falling thereon through gaps in the seams.

5. In a cloth shear, a frame, rotary and ledger blades thereon, a cloth rest arranged in cooperative position with respect thereto to support a cloth web as it passes thereby to be sheared by the rotary and ledger blades, and means to cause relative separation of the blades and the cloth rest to jump a seam, a series of light-sensitive devices positioned in the frame of the machine so as to receive light falling thereon through gaps in the cloth web, said light-sensitive devices being arranged in spaced relation transversely of the web and in a circuit to provide for closing the circuit when light falls on any one of said light-sensitive devices, means under control of the circuit for actuating said separating means, means for maintaining the rotary blade and ledger blade in relatively fixed position in the frame, said separating means acting to move only the cloth rest, said cloth rest separating means including an eccentric shaft, means to at least partially rotate the same including a flexible member, a solenoid and a resilient member, said solenoid and resilient member being attached to said flexible member at opposite ends thereof, and said light-sensitive device controlling the action of the solenoid to move the same in a direction to tension the flexible means so as to at least partially rotate the shaft in a direction to retract the cloth rest.

6. Seam jumping mechanism for a cloth shearing machine including a rotary and ledger blade shearing means in combination with a cloth rest, means mounting the cloth rest for motion to and from the rotary and ledger blades and means maintaining the rotary blade and ledger blade in fixed relation to each other and to the machine, means for moving the cloth rest in order to provide a gap in the shearing action as a seam approaches the shearing area, said cloth rest moving means including a control embodying a light-sensitive device positioned adjacent the cloth rest and deriving its actuating light through a traveling cloth web as it approaches the cloth rest, and manually operated means for retracting said cloth rest at will, the cloth rest mounting means including an eccentric shaft and means to rotate the same, said hand means being operatively connected with respect thereto for operation thereof.

7. Seam jumping mechanism for a cloth shear as set forth in claim 6 including a solenoid for actuating the eccentric shaft rotating means, said light-sensitive device controlling the actuation of the solenoid by closing an electric circuit thereto when a gap in the web passes the light-sensitive device.

References Cited in the file of this patent

UNITED STATES PATENTS

| | | |
|---|---|---|
| 562,375 | Chapal | June 23, 1896 |
| 1,686,499 | Richardson | Oct. 2, 1928 |
| 1,749,829 | Mason | Mar. 11, 1930 |
| 2,305,255 | Hogue | Dec. 15, 1942 |
| 2,321,481 | Hadley | June 8, 1943 |
| 2,321,482 | Hadley | June 8, 1943 |
| 2,389,800 | Marble | Nov. 27, 1945 |

FOREIGN PATENTS

| | | |
|---|---|---|
| 742,495 | Germany | Mar. 31, 1944 |
| 16,757 | Great Britain | of 1891 |
| 782,411 | Great Britain | Sept. 4, 1957 |